United States Patent Office 3,426,061
Patented Feb. 4, 1969

3,426,061
PREPARATION OF ACRYLONITRILE AND METHACRYLONITRILE
Wilhelm Gruber, Darmstadt, Germany, assignor to Rohm & Haas G.m.b.H., Darmstadt, Germany
No Drawing. Filed Aug. 2, 1965, Ser. No. 476,716
Claims priority, application Germany, Aug. 1, 1964, R 38,509
U.S. Cl. 260—465.3       5 Claims
Int. Cl. C07c *121/04, 45/02;* B01j *11/82*

ABSTRACT OF THE DISCLOSURE

Method of making acrylonitrile or methacrylonitrile from propylene or isobutylene respectively, directly or in two stages with intermediate aldehyde formation, by reacting the olefin with oxygen and ammonia in the presence of a molybdenum oxide-bismuth oxide catalyst containing sulfate ions.

---

The invention relates to a method of producing acrylonitrile and methacrylonitrile by reacting propylene and isobutylene, respectively, with oxygen and ammonia in the presence of a catalyst.

The catalytic oxidation of olefins with molecular oxygen in the presence of ammonia to form unsaturated nitriles is in itself known. For example, German Patent 941,428 describes a method in which the olefins are first converted in the prescence of an oxidation catalyst into the corresponding aldehydes and the latter then reacted with ammonia and oxygen in the presence of another oxidation catalyst to form unsaturated nitriles. This method is preferably carried out with the simultaneous use of elementary selenium, the removal of which from the reaction product requires additional steps. A single-step method for producing unsaturated nitriles from olefins is described in U.S. Patent 2,481,826, in which the use of catalysts containing vanadium oxide, molybdenum oxide and phosphorus oxide is emphasized as particularly advantageous. The yields of unsaturated nitriles obtained thereby are, however, not satisfactory.

German provisional Patent 1,127,351 suggests the use of contact agents which contain bismuth, tin or antimony salts of molybdic acid, phosphomolybdic acid or phosphotungstic acid as catalysts suitable for the conversion of olefins into the corresponding unsaturated nitriles. The examples of said patent indicate these catalysts to be particularly suitable for the preparation of acrylonitrile.

It has now been found that surprisingly high yields of unsaturated nitriles of 3 to 4 carbon atoms, i.e., acrylonitrile and methacrylonitrile, are obtainable by reacting the corresponding mono-olefin of 3 to 4 carbon atoms, i.e., propylene and isobutylene, respectively, in gaseous phase with ammonia, oxygen and preferably steam at temperatures of 350 to 600° C., particularly at 400 to 500° C., in the presence of a catalyst consisting essentially of molybdenum, bizmuth and oxygen in the form of molybdenum and bismuth oxides, preferably in a ratio of 5–60 parts by weight bismuth to 15–65 parts by weight molybdenum, and up to 30% by weight, based on the total weight of bismuth, molybdenum and oxygen, of sulfate ions.

The method of the invention can be carried out in a single step or, if desired, in two steps. In the two-step process the olefins are first oxidized to the corresponding unsaturated aldehydes and the latter are then reacted in the presence of ammonia and oxygen, with the use of the catalysts of the invention, to form the unsaturated nitriles.

The molar ratio of olefin to oxygen is between 1:0.5 and 1:4, preferably from about 1:1 to 1:3, and the molar ratio of ammonia to olefin is within the range of 1:0.5 to 1:2, preferably about 1:1. An addition of steam is advisable also in carrying out this method.

The molybdenum oxide-bismuth oxide catalyst is readily prepared by adding, to an aqueous suspension of a carrier material, such as colloidal silica, aluminum oxide, silicon carbide or alumina, which is inert under the conditions of the reaction, a molybdic acid or an ammonium molybdenate suspension or solution, respectively, sulfuric acid or a metal sulfate, e.g., cadmium sulfate, zinc sulfate, sodium sulfate, barium sulfate or the like, possibly in solution, or a combination thereof. Thereupon, bismuth nitrate dissolved in dilute nitric acid is added while agitating and the water is evaporated from the resultant solution. After drying, the mixture is heated for several hours at about 550° C. Depending on the particle size, the catalyst composition prepared in this manner can be used for conversion in a stationary catalyst bed or for conversion by the fluidized bed process.

The minimum concentration of sulfate ions in the catalyst is not particularly critical except to the extent that it should be sufficient, i.e., of the order of about one percent, to produce a significant improvement in results.

The performance of a catalyst unmodified in accordance with this invention and described in in Patent 1,127,351 was compared with the performance of the catalysts of the invention under the same experimental conditions. The catalysts were prepared as follows:

Catalyst A.—A solution of 9.3 cc. 85% phosphoric acid ($H_3PO_4$), 272 g. molybdic acid (85% $NcO_3$), 40 cc. nitric acid and 582 g. bismuth nitrate [$Bi(NO_3)_3 \cdot 5H_2O$] in 400 cc. water was added to the 750 g. of an aqueous solution of a colloidal silica gel that contains 30% by weight silicic acid. The mixture was then evaporated and heated for 16 hours at 538° C. and then ground to particles having sieve sizes of from 235 to 1460 meshes per cm.²

Catalyst B.—Same as Catalyst A, but $H_3PO_4$ replaced by an equimolar quantity of $H_2SO_4$.

Catalyst C.—Same as Catalyst A, but $H_3PO_4$ replaced by an equimolar quantity of $CdSO_4$.

Catalyst D.—Same as Catalyst A, but $H_3PO_4$ replaced by an equimolar quantity of $ZnSO_4$.

Catalyst E.—Same as Catalyst A, but $H_3PO_4$ replaced by an equimolar amount of $Na_2SO_4$.

Catalyst F.—Same as Catalyst A, but $H_3PO_4$ replaced by an equimolar amount of $BaSO_4$.

The comparative tests were carried out in the following manner:

The catalyst (approximately 30 g.) was in each test placed into a quartz tube, to a bed height of 14 cm., having an internal diameter of 2 cm. and provided with an externally wound heating coil.

A reaction mixture of 1.1 l.p.h. (liters per hour) propylene, 1.1 l.p.h. ammonia, 7.6 l.p.h. air and 1.9 l.p.h. steam was conducted over the catalyst. The reaction temperature at the catalyst was adjusted by means of the heating coil and measured with a thermocouple. Each of the tests was carried out for five hours.

The results are shown in the following table:

TABLE

| Test No. | Catalyst | Temp., C. | Propylene consumed, percent | NH₃ consumed, percent | Yield of acrylonitrile in percent | Selectivity based on propylene, percent | Selectivity based on NH₃, percent |
| --- | --- | --- | --- | --- | --- | --- | --- |
| 1 | A | 450 | 42.4 | 60 | 21.8 | 51.4 | 36.3 |
| 2 | A | 480 | 59.5 | 84.5 | 28.6 | 48 | 33.8 |
| 3 | B | 450 | 69.2 | 67.3 | 39.3 | 56.8 | 58.4 |
| 4 | B | 480 | 78.2 | 76.4 | 39.8 | 51 | 52.1 |
| 5 | C | 456 | 74.5 | 56.4 | 40.7 | 54.7 | 72.3 |
| 6 | C | 480 | 72.7 | 74.5 | 41.5 | 57 | 55.7 |
| 7 | D | 450 | 60 | 61.1 | 29.4 | 49 | 48.1 |
| 8 | D | 480 | 76.4 | 64 | 35.4 | 46.4 | 55.3 |
| 9 | E | 450 | 74.6 | 40 | 33.2 | 44.5 | 83 |
| 10 | E | 480 | 83.6 | 58.2 | 41.4 | 49.2 | 71.2 |
| 11 | F | 450 | 74.5 | 50.9 | 35.4 | 47.5 | 69.6 |

It is evident from the data in the table that the catalysts of the invention (B–F) are not only appreciably more effective in bringing about a conversion of the propylene, but also in significantly increasing the yield of acrylonitrile by from about 50% (Test No. 9) to about 90% (test No. 5) as compared with prior art catalyst A. Also, it is noteworthy that the yield of acrylonitrile, related to the amount of ammonia consumed, increased from 36.3% to 72.3% at 450° C. and from 33.8% to 55.7% at 480° C. by use of Catalyst C as compared with Catalyst A.

The advantages and preferred embodiments of the invention will become further apparent from the following examples:

EXAMPLE 1

A gaseous mixture of 2 l.p.h. steam, 1 l.p.h. isobutylene, 1 l.p.h. ammonia and 8 l.p.h. air were passed through a bed of catalyst B at 480° C. under the conditions and in the apparatus described in the previous tests. The results were:

| | Percent |
| --- | --- |
| Isobutylene consumed | 24.65 |
| Ammonia consumed | 72.8 |
| Yield of methacrylonitrile | 14.23 |
| Selectivity, based on isobutylene | 57.7 |
| Selectivity, based on ammonia | 19.55 |

EXAMPLE 2

A. Preparation of catalyst

A suspension of 81.6 grams molybdic acid (85% molybdenum trioxide) to which 4.77 grams of sulfuric acid had been added, and then a solution of 174.6 grams of bismuth nitrate pentahydrate in 300 ml. of water and 120 ml. of concentrated nitric acid were added to a slurry of 67.5 grams of finely divided silica in 900 ml. of water. The mixture was then concentrated by evaporation with continued agitation until it had the consistency of a paste and this mass was then molded with an extrusion press. After drying at 100° C. followed by heating for eight hours at 500–540° C., the catalyst was obtained in the form of cylindrical pieces of a diameter of 3 mm. and a length of 5–10 mm.

B. Oxidation reaction

Over 60 grams of catalyst (bulk volume 105 ml.) there was passed at maximum catalyst temperature of 450° C., a gas mixture consisting of 1 l.p.h. isobutylene, 1 l.p.h. ammonia, 12 l.p.h. air and 2.1 l.p.h. of steam. The test was run for 52½ hours without interruption The results obtained during the last 4½ hours were:

| | Percent |
| --- | --- |
| Isobutylene consumed | 73.5 |
| Selectivity, based on isobutylene | 58.1 |
| Ammonia consumed | 64 |
| Selectivity, based on ammonia | 66.7 |
| Methacrylonitrile, percent of the theoretical yield | 42.7 |

I claim:

1. A process for the preparation of an olefinically unsaturated nitrile of 3 to 4 carbon atoms which comprises contacting, at a temperature within the range of about 350° C. to 600° C. and in the gaseous phase, oxygen, ammonia, and a monoolefin of 3 to 4 carbon atoms with a catalyst consisting essentially of molybdenum oxide, bismuth oxide, and from about 1 percent up to 30 percent, by weight of said oxides, of sulfate ions introduced into said catalyst as sulfuric acid, the molar ration of olefin to oxygen being in the range of 1:0.5 to 1:4 and the molar ratio of ammonia to olefin being in the range of 1.0.5 to 1:2.

2. A process for the preparation of an olefinically unsaturated nitrile of 3 to 4 carbon atoms which comprises contacting, at a temperature within the range of about 350° C. to 600° C. and in the gaseous phase, oxygen, ammonia, and a mono-olefin of 3 to 4 carbon atoms with a catalyst consisting essentially of molybdenum oxide, bismuth oxide, and from about 1 percent up to 30 percent, by weight of said oxides, of sulfate ions introduced into said catalyst as cadmium sulfate, the molar ratio of olefin to oxygen being in the range of 1:0.5 to 1:4 and the molar ratio of ammonia to olefin being in the range of 1:0.5 to 1:2.

3. A process for the preparation of an olefinically unsaturated nitrile of 3 to 4 carbon atoms which comprises contacting, at a temperature within the range of about 350° C. to 600° C. and in the gaseous phase, oxygen, ammonia, and a mono-olefin of 3 o 4 carbon atoms with a catalyst consisting essentially of molybdenum oxide, bismuth oxide, and from about 1 percent up to 30 percent, by weight of said oxides, of sulfate ions introduced into said catalyst as zinc sulfate, the molar ratio of olefin to oxygen being in the range of 1:0.5 to 1:4 and the molar ratio of ammonia to olefin being in the range of 1:0.5 to 1:2.

4. A process for the preparation of an olefinically unsaturated nitrile of 3 to 4 carbon atoms which comprises contacting, at a temperature within the range of about 350° C. to 600° C. and in the gaseous phase, oxygen, ammonia, and a mono-olefin of 3 to 4 carbon atoms with a catalyst consisting essentially of molybdenum oxide, bismuth oxide, and from about 1 percent up to 30 percent, by weight of said oxides, of sulfate ions introduced into said catalyst as sodium sulfate, the molar ratio of olefin to oxygen being in the range of 1.0.5 to 1:4 and the molar ratio of ammonia to olefin being in the range of 1:0.5 to 1:2.

5. A process for the preparation of an olefinically unsaturated nitrile of 3 to 4 carbon atoms which comprises contacting, at the temperature within the range of about 350° C. to 600° C. and in the gaseous phase, oxygen, ammonia, and a mono-olefin of 3 to 4 carbon atoms with a catalyst consisting essentially of molybdenum oxide, bismuth oxide, and from about 1 percent up to 30 percent, by weight of said oxides, of sulfate ions introduced into said catalyst as barium sulfate, the molar ratio of olefin to oxygen being in the range of 1:0.5 to 1:4 and the molar ratio of ammonia to olefin being in the range of 1:0.5 to 1:2.

(References on following page)

References Cited

UNITED STATES PATENTS

| | | | |
|---|---|---|---|
| 2,904,580 | 9/1959 | Idol | 260—465.3 |
| 3,293,279 | 12/1966 | Young et al. | 260—465.3 |
| 3,282,982 | 11/1966 | Callahan et al. | 260—465.3 |
| 3,287,394 | 11/1966 | Young et al. | 260—465.3 |

JOSEPH P. BRUST, *Primary Examiner.*

U.S. Cl. X.R.

252—440; 260—604